(12) United States Patent
Vizor et al.

(10) Patent No.: US 9,247,560 B2
(45) Date of Patent: *Jan. 26, 2016

(54) MOBILE COMMUNICATIONS NETWORK

(71) Applicant: Vodafone Group PLC, Newbury (GB)

(72) Inventors: Matthew Vizor, Newbury (GB); Graeme Hardy, Newbury (GB); Chris Jones, Newbury (GB); Christine Rickard, Newbury (GB)

(73) Assignee: Vodafone Group PLC, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,460

(22) Filed: Apr. 30, 2014

(65) Prior Publication Data

US 2014/0233510 A1    Aug. 21, 2014

Related U.S. Application Data

(63) Continuation of application No. 12/737,560, filed as application No. PCT/GB2009/050931 on Jul. 27, 2009, now Pat. No. 8,750,203.

(30) Foreign Application Priority Data

Jul. 25, 2008 (GB) .................................. 0813611.1

(51) Int. Cl.
*H04W 4/00* (2009.01)
*H04W 72/12* (2009.01)
(Continued)

(52) U.S. Cl.
CPC ....... *H04W 72/1231* (2013.01); *H04L 12/5695* (2013.01); *H04L 47/781* (2013.01);
(Continued)

(58) Field of Classification Search
USPC .......................................... 370/328, 338, 232
See application file for complete search history.

(56) References Cited

U.S. PATENT DOCUMENTS 5,845,142 A    12/1998 Hayasaka
6,556,817 B1    4/2003 Souissi et al.
(Continued)

FOREIGN PATENT DOCUMENTS

EP    2 319 227 A1    5/2001
EP    1 278 390 A1    1/2003
(Continued)

OTHER PUBLICATIONS

Search Report dated Oct. 15, 2008 corresponding to GB Application No. 0813611 filed Jul. 25, 2008.

*Primary Examiner* — Man Phan
*Assistant Examiner* — Pamit Kaur
(74) *Attorney, Agent, or Firm* — Knobbe, Martens, Olson & Bear, LLP

(57) ABSTRACT

Controlling data transfer between a mobile device and a data telecommunications network includes receiving a service request requiring a data transfer, determining at least one parameter requirement relating to the service request from a predefined profile, determining a network/user condition relating to one or more of the at least one parameters, comparing the one or more parameter requirements with the relevant network/user condition, and using the comparison to determine whether or not to proceed with the service request. Data transfer to and/or from a mobile device may be managed so that the network conditions, such as available signal strength and bearer type, are taken into consideration before proceeding with the data transfer. Accordingly, if the network conditions are not suitable for the service request requiring a data transfer, it is possible to not proceed with the request, such as by delaying it until network conditions become suitable.

22 Claims, 3 Drawing Sheets

(51) Int. Cl.
*H04L 12/54* (2013.01)
*H04L 12/911* (2013.01)
*H04L 12/927* (2013.01)
*H04W 48/18* (2009.01)
*H04L 29/08* (2006.01)

(52) U.S. Cl.
CPC ............ *H04L47/808* (2013.01); *H04L 47/824* (2013.01); *H04L 67/325* (2013.01); *H04W 48/18* (2013.01); *H04L 67/06* (2013.01); *H04L 67/1095* (2013.01)

(56) References Cited

U.S. PATENT DOCUMENTS

| | | | |
|---|---|---|---|
| 8,750,203 B2 * | 6/2014 | Vizor et al. | ............ 370/328 |
| 2002/0037726 A1 | 3/2002 | Czaja et al. | |
| 2002/0054569 A1 | 5/2002 | Morikawa | |
| 2002/0073140 A1 | 6/2002 | Chae | |
| 2003/0100308 A1 | 5/2003 | Rusch | |
| 2003/0123422 A1 | 7/2003 | Miya | |
| 2004/0180677 A1 | 9/2004 | Harris et al. | |
| 2007/0130067 A1 | 6/2007 | Keller | |
| 2009/0203394 A1 | 8/2009 | Shaffer et al. | |
| 2009/0233600 A1 | 9/2009 | Johansson et al. | |

FOREIGN PATENT DOCUMENTS

| | | |
|---|---|---|
| EP | 1 906 627 A1 | 4/2008 |
| WO | WO 99/00971 | 1/1999 |
| WO | WO 01/15425 A2 | 3/2001 |
| WO | WO 2004/057828 A1 | 7/2004 |
| WO | WO 2004/102999 A1 | 11/2004 |
| WO | WO 2006/115339 A1 | 11/2006 |

* cited by examiner

MOBILE COMMUNICATIONS NETWORK

This application is a continuation of U.S. application Ser. No. 12/737,560 (now U.S. Pat. No. 8,750,203) filed Mar. 24, 2011 (pending), which is incorporated herein by reference.

SUMMARY OF THE INVENTION

The present invention relates to a mobile communications network and a method of controlling data transfer in the network, typically between a mobile device and a network element. More particularly the present invention relates to a method of, and arrangement for, controlling mobile terminal data backup events to a remote server location and content downloading usage.

BACKGROUND

Mobile communications have advanced markedly from its earliest beginnings of providing users with a means of voice and data communication wirelessly from any location within range of a base station. This has developed into being able to provide mobile broadband connectivity to any suitable mobile device, including mobile phones, PDAs and PCs with a suitable connectivity card. Mobile broadband services can be provided on various networks, including GSM using HSDPA, UMTS, WiMaX and the currently under-development LTE network.

This improved access to such wireless services, however, has not been without its problems, particularly since there is generally not a global service scheme with a predefined tariff for services regardless of the user's location. That is, services are generally managed by service providers on a country by country basis, so that users get a "home" tariff scheme for services provided from within their home country, but different rates for other countries. The rates for other countries are generally higher than the home tariff, in order to account for various factors, such as currency exchange and termination rates to international service providers for the use of their networks.

This difference in tariff is particularly acute where users are given a quantity of inclusive data (i.e. data bundles) that they can download as part of their tariff. This free download volume, typically only applies to data downloaded within the user's home country. Whilst the user is still able to perform data downloads in other countries, these downloads are typically charged to the user based upon the amount of data downloaded (i.e. volume based charging per megabyte). Therefore, there have been instances of user's inadvertently downloading large quantities of data whilst not in their home country, and then receiving unexpectedly high bills for the services. This could occur due to the user not being fully aware of the costs involved, or unknowingly downloading the data, such as by leaving their device unlocked whilst travelling.

There is therefore a need to minimise the risk of users inadvertently tallying up such unexpectedly high bills.

Because of this problem, a related issue is in regard to data backup and restore. It has become a standard procedure for individuals and business to backup the data on their computers to a separate disk, in order to ensure data is not lost, or at least minimise the amount of data that is lost, in the event of a computer failure. Where a failure does occur, the disk can then be used to restore the data to the computer at the point at which it was last backed up.

The same procedure is now available for mobile devices, with many users now having an automatic "backup and restore" capability on their mobile computing device, which they set to intermittently back up their data wirelessly with their network provider. The types of data that would be "backed up" by uploading to a remote server include contact databases, message databases (e.g. emails, sms messages), photograph and music databases and any other data stored on the mobile devices, including documents.

This wireless backup and restore is a recommended service, in order to ensure that users do not lose any data in the event of a system failure on their mobile computing device, or even in the event of theft or otherwise losing the computing device. Where a system failure does occur, and a user needs to restore data to their mobile device, contact is made with the remote storage server in order to download the data last backed up. The remote server therefore needs a secure authorisation process to be in place to ensure that only valid users access their data.

Whilst the automatic procedure backup and restore process is manageable for users with a download/upload allowance in their home network, an issue may exist for cost sensitive users that are roaming.

To address this problem, it is possible for users to implement the backup and restore functionality manually, however a manual approach may lead to the user not backing up as often or as regularly as they should. This in turn could lead to the user inadvertently losing data.

Another problem with mobile broadband connectivity is that the service is not uniform from the perspective of download speeds. Mobile broadband cellular networks are bursty by nature, and although competitive and often superior to Ethernet and WLAN from a speed perspective, they are not dimensioned to cope with persistent and similar data volumes, such as are required during large data downloads. Therefore a user may chose to download a video clip using mobile broadband, but due to the network conditions at that given point in time, may only obtain a low download speed. This can be quite frustrating for the user, particularly if they feel they are waiting for their service longer than expected.

This same problem applies to uploading data, such as when utilising a backup data service.

Similarly, where a plurality of network types coexist, but not necessarily in the same region, a user may have access to a 3G GPRS network in one locality, but only an "Enhanced Data rate for GSM Evolution" (EDGE) network (i.e. a 2.5G network offering lower data speeds than 3G) in another locality. When the faster 3G service is not available to the user to download/upload data, the slowness of the service utilised may result in a lower user experience. It may also introduce a need for the user to optimise his use of the smaller available bandwidth.

There is therefore also a need to reduce the instances when the mobile broadband network is not able to offer an efficient download and/or upload speed.

SUMMARY OF THE INVENTION

According to a first aspect, the present invention provides a method of controlling data transfer between a mobile device and a mobile telecommunications network including: receiving a service request requiring a data transfer; determining at least one parameter requirement relating to the service request from a predefined parameter profile; determining a current parameter state relating to the at least one parameter requirement; comparing the current parameter state with a relevant parameter requirement; and using the comparison to control a timing of the data transfer.

This aspect of the invention enables data transfer to and/or from a mobile device to be managed so that the current network parameter states, such as available signal strength and bearer type, can be taken into consideration before proceeding with the data transfer. In this way, if the network conditions are not suitable for the service request requiring a data transfer, it is possible to advise the user that it is not recommended to proceed with the request, and/or delay it until network conditions become suitable.

In a similar manner, user parameter states may be taken into consideration before proceeding with the data transfer. In this way, if for example, user's tariff plan provides a maximum data transfer amount and/or defines set days or times of day in which data transfers are free (e.g. the tariff may provide the user with free downloads on the weekend or between 12 am and 5 am everyday), it is possible to advise the user that it is not recommended to proceed with the request (e.g. if the request exceeds the user's free maximum transfer amount, or the request is outside the free download time periods), and/or the service request may be restricted/postponed as required.

This aspect of the invention therefore serves to prevent the user receiving "bill shock" or a poor user experience. Advantageously this assists with minimising user confusion, and also enhancing user confidence in being able to make use of data download/upload services without any unexpected adverse monetary consequences.

Other aspects of the invention are defined in the attached set of claims.

BRIEF DESCRIPTION OF THE DRAWINGS

Embodiments of the invention will now be described with reference to the accompanying drawings, in which.

DETAILED DESCRIPTION

Figure 1:
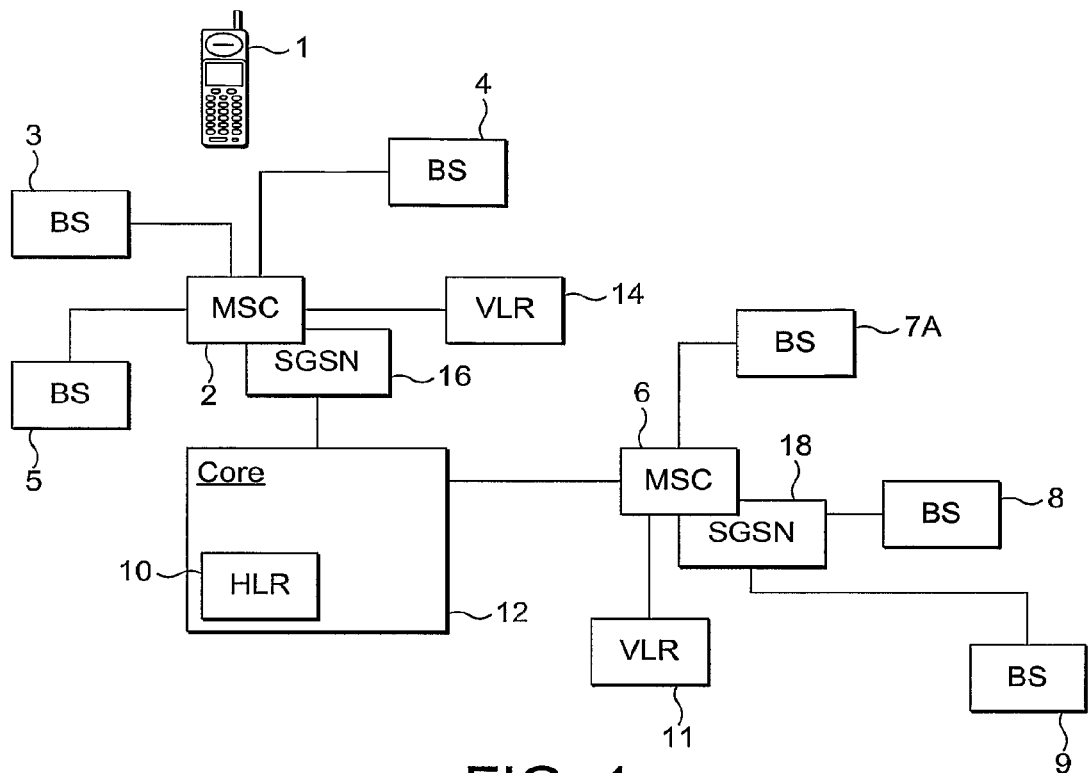
FIG. 1 is a diagrammatic drawing of key elements of a mobile telecommunications network for use in explaining the operation of such a network, as well as the embodiments of the present invention.

Key elements of a mobile telecommunications network, and its operation, will now briefly be described with reference to FIG. 1.

Each base station (BS) serves a respective cell of its cellular/mobile telecommunication network and receives calls/data from and transmits calls/data to a mobile device in that cell by wireless radio communication in one or both of the circuit switched or packet switched domains. Such a subscriber's mobile device (UE) is shown at 1. The mobile device may be any suitable portable device, including a handheld mobile telephone, a personal digital assistant (PDA) or a laptop computer equipped with a network connectivity datacard.

In a GSM mobile telecommunications network, each base station includes a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B which combines the RNC and Node B functionalities. The base stations are arranged in groups and each group of base stations is likely to be controlled by a Mobility Management Entity (MME) and a User Plane Entity (UPE).

Conventionally, in a GSM/UMTS network, the base stations are arranged in groups and each group of base stations is controlled by one serving GPRS support node (SGSN), such as SGSN 16 for base stations 3, 4 and 5. As shown in FIG. 1, the network has another SGSN 18, which is controlling a further three base stations 7, 8 and 9. In practice, the network will incorporate many more SGSNs and base stations than shown in FIG. 1. The base stations 3, 4, 5, 7, 8 and 9 each have dedicated (not shared) connection to their SGSN—typically a cable connection. This prevents transmission speeds being reduced due to congestion caused by other traffic.

The SGSNs 16 and 18 are provided to support communications in the packet switched domain—such as GPRS data transmissions. The SGSNs 16 and 18 are in turn connected to a gateway GPRS support node (GGSN—not shown), which provides a gateway to data networks, such as the Internet, in order to provide mobile broadband services.

Corresponding Mobile Switching Centres (MSCs) 2 and 6 support communications in the circuit switched domain—typically voice calls. The MSCs function in an analogous way to the SGSNs.

Each subscriber to the network is provided with a smart card or SIM which, when associated with the user's mobile terminal identifies the subscriber to the network. In this regard, the SIM card is pre-programmed with a unique identification number, the "International Mobile Subscriber Identity" (IMSI), for use by the network, but which is not generally known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as information regarding the user's network tariff plan.

With this background in mind, a first embodiment of the invention will now be described in relation to a portable device utilising a cellular network to provide mobile broadband services.

According to this embodiment, a business logic decision engine is associated with the device which is configured to monitor a number of parameters, particularly relating to data download, data upload, the network, the mobile device and/or the user of the mobile device. For instance, the engine may be configured to monitor any one, or combination of, the following:

network/bearer type (e.g. GPRS/EDGE/3G/HSDPA/HSUPA/HSPA+);
roaming status (e.g. home network/domestic roaming/internationally roaming);
signal strength;
data download/upload estimate;
time/date;
user's data usage tariff (i.e. unlimited, capped, network specific, volume/time-based charging);
device battery life; and
Backup type (e.g. initial backup of all data/"delta" backup of only changed data).

The engine is configured to compare the parameter measurements to one or more predetermined parameter requirements in order to make an informed judgement or recommendation to the terminal user regarding their download/upload data usage. They can also be used to allow the user to create exceptions to their mobile broadband usage.

The parameter measurements are actual system conditions/statuses, and will typically reflect terminal conditions, user conditions and/or network conditions. These parameter measurements can be determined by the engine itself, or provided to the engine by one or more external sources, such as from the user and/or network. For example, the connection QoS/speed and signal state parameter measurements will typically be determined through interaction with the device's mobile broadband components, such as a wireless data connectivity modem.

Figure 2:
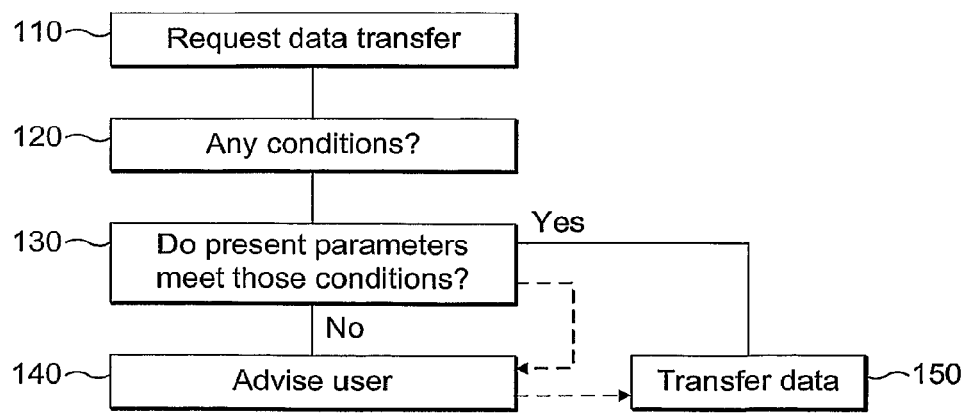
FIG. 2 is a flow diagram of an embodiment of the invention including conditions on data transfer.

FIG. 2 is a flow diagram showing an embodiment of the invention. At 110 a request is made for a data transfer. The request may be made manually by a user, may be prompted automatically by the mobile communication device or may be prompted by third party remote from the device, for example a third party company might broadcast that an update is available to application software to which the user subscribes is available.

At 120 the engine determines whether any predefined conditions exist for data transfer. In certain embodiments the conditions may be set by the user and in further embodiments the conditions may be set by the network provider and stored in the device. The conditions are associated with particular parameter requirements and may identify specific parameters or ranges of parameters in which data transfer may be permitted, for example network or bearer on which the device is currently camped, time of day, size of data file, cost of transfer of data, signal strength etc. If conditions for data transfer have been set the engine compares the current parameters with the parameters defined in the predefined conditions at 130. If the current parameters meet the predefined conditions then data transfer is permitted at 150. In certain embodiment data transfer will then be executed automatically and in further embodiment the engine may advise the user that data transfer is approved. In yet further embodiments the engine may still require manual authorisation from the user before executing the data transfer.

If the present parameters do not meet the parameters defined in the predefined conditions at 130, the engine may refuse the data transfer. In further embodiments, the engine may advise the user of the current conditions at 140 and alert the user that current parameters do not meet the predefined conditions. In certain embodiments the user may still be permitted to authorise data transfer.

EXAMPLE 1

In a first example embodiment of the invention, the engine may implement a straightforward profile of disallowing all download/upload requests when the mobile device is roaming. This example is ideal for a cost conscious user, who does not want any risk of inadvertently downloading or uploading data and thereby generating unexpected monetary charges. In an alternative version of this example, in the event of the engine determining that the mobile device is roaming, rather than simply blocking all download/upload requests, the engine will flag the issue with the device user before proceeding.

For instance, upon the engine determining that the device's user interface (UI) components such as a web browser or backup & restore client may need to be activated, the engine will determine the network on which the device is currently operating. The engine will then determine if the device is operating on its home network or on a roaming network. If the device is operating on a roaming network, before allowing the browser set up procedure to proceed, the engine may remind the user of the roaming situation, such as with a message:

"You are roaming and inclusive data bundle allowance is currently not usable. You will therefore be charged for this service. Do you wish to proceed?"

In this way the user is reminded of the situation and able to make an informed decision regarding whether or not to incur further costs. A further advantage of this example, from the service provider's point of view, is that it provides them with a confirmation of user agreement to the additional costs, in case of any future billing dispute.

Alternatively the engine may simply refuse the data transfer request if the device is operating on a roaming network.

EXAMPLE 2

In certain embodiments of the invention, the engine presents the user with more information about the expected cost of proceeding with the data transfer in the present operating network. In such embodiments, details of the user's tariff may be stored on, or accessed by, the engine. When the user requests transfer of data, the engine compares the current network with networks stored against the user's tariff and presents to the user in the message the specific cost implications of proceeding with the data transfer. In a standard embodiment different costs may be associated with transfer on the home network and transfer when operating on a roaming network. As part of the cost estimate, the engine may determine the size of the file to be transferred and calculate the estimated cost associated with that size data file in the current network based on the user's tariff.

In further embodiments, users can set predefined cost limits above which the user requests a prompt for authorisation and below which the user automatically authorises. For example, a user may set a predefined limit to automatically allow any data transfer which is expected to cost less that £1 but to request a message prompting authorisation for any data transfer expected to cost more than £1.

Further embodiments offer the user the option to select payment method when receiving an authorisation prompt. For example, the user might wish to charge the data transfer to his mobile subscription or pay via a different route, for example credit card.

EXAMPLE 3

In a further embodiment of the invention, the engine makes decisions, or requests authorisation, of whether to execute a data transfer based on the bearer to which the device is currently connected. If a user requests the download of data, such as a music video or even an episode of a television program, the engine will note the service request and check if a parameter profile has any requirements for such a service, such as a minimum signal strength requirement and/or a required bearer type (i.e. 3G only). The parameters defined in this profile may be set, for example, by the service provider and/or the user. The profile is typically a table stored in a memory defining parameter properties, such as ranges, limits and types, which are applicable to each type of service request. Examples of "service requests" include data downloads, uploads, data back up requests and data restore requests.

Therefore, once any parameter requirements are determined, the engine will determine the current status of those parameters. For instance, if the profile requires only 3G bearers to be used for the service, the engine will determine what bearer the terminal is currently connected to and/or what bearers are available to the terminal in its current position. Where the mobile device is connected to a 3G bearer, the service will be allowed to proceed. Where the device is not connected to a 3G bearer, but one is available, the engine may initiate a request to the terminal to update bearers in order to allow the download to take place. However, where the device is not currently connected to a suitable bearer, and a suitable one is not available, the service request will be cancelled or not be allowed to proceed at that point in time.

In this regard, a message could be sent to the user by displaying a message on the device's display screen that "a suitable network is not available at this time, please try again later". Alternatively, an override option may be given to the user, for instance stating that "A preferred bearer is not available at this time, so any downloads that take place will be slow. If you would nevertheless like to proceed, press enter."

The engine may also provide the user with an estimated download time, where the size of the file to be downloaded is known, as well as the download speed available.

In a further alternative, the message could be that "a suitable network is not available at this time. The download, however, will automatically take place once a suitable network becomes available." In this option, the engine will buffer the download request, and continually monitor the networks that are available until a suitable one is accessible. The engine will then allow the download to proceed.

Before proceeding however, the engine would preferably re-check the parameter profile to ensure that any other parameter requirements are still met. For example, by the time the engine determines a suitable network exists, the terminal may have moved outside its home network, and the profile may require that downloads only occur in the device's home network. Therefore, if the engine finds this other parameter to now not be met, the download request will be maintained as pending.

From this example, it can be seen that the user is able to be offered with an enhanced experience as they can be made aware of any download problems before the download is proceeded with. Further, the ability to download data efficiently is provided, by waiting until a suitable network is available. This prevents undue wastage of the device's resources that would normally occur during a lengthy download procedure.

Figure 3:
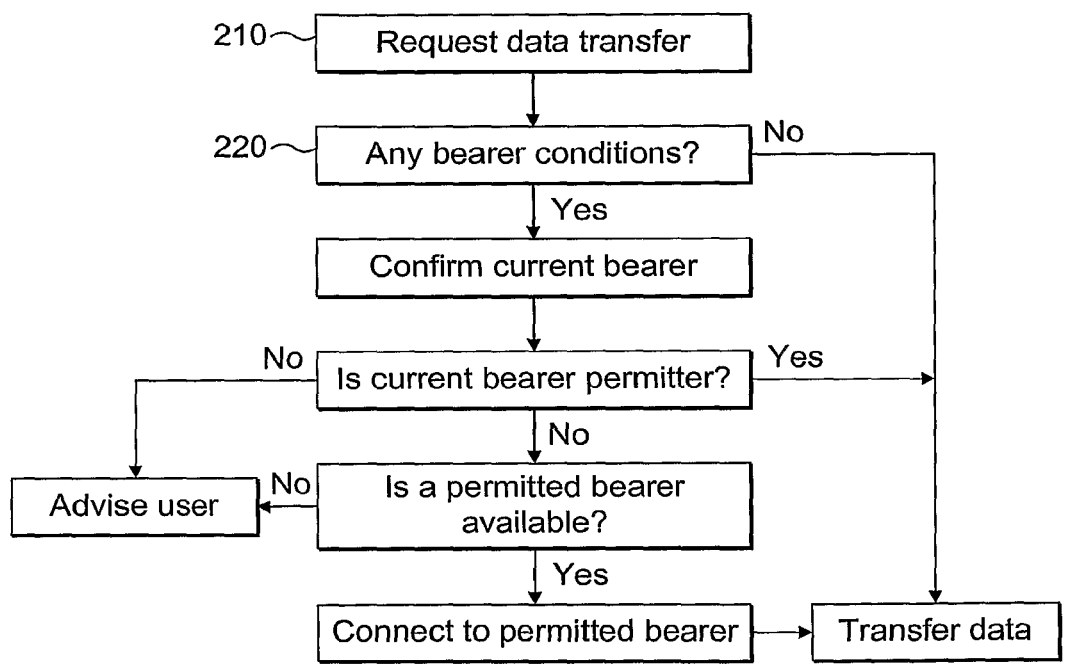
FIG. 3 is a flow diagram of an embodiment of the invention including bearer conditions on data transfer.

FIG. 3 is a flow diagram showing the steps taken in embodiments of the invention which have conditions associated with transfer of data in respect of the bearer on which the device is currently operating. At 210 the engine determines that a request for data transfer has been made. This may be a manual user request for upload or download or an automatic request from the device, for example a daily update.

At 220 the engine checks whether there are any conditions associated with data transfer in respect of the bearer. Such conditions may be stored in a look up table within a storage area of the device. If there no conditions based on bearer the engine authorises the transfer of the data at 220. In further embodiments of the invention additional conditions in relation to other parameters may be specified, for example roaming condition or cost, in such embodiments the engine would compare the current parameters with those specified parameters before authorising the data transfer. The present example assumes that there are no relevant conditions other than the bearer. Once the transfer is authorised the data is transferred at 270.

If there are conditions on the bearer at 220, the engine identifies the current bearer at 230, for example 3G. At 240 the engine compares the current bearer with those bearers permitted by the device/user. The permitted bearers will typically be identified in a look up table stored within a storage area of the device. If the current bearer is a permitted bearer at 240 (and assuming no further conditions apply) the engine authorises data transfer and the data is transferred at 270.

If the current bearer is not permitted for data transfer, in certain embodiments of the invention the engine advises the user at 780, for example in the form of a message as discussed above. Such a message might indicate that the current bearer is not permitted so data transfer is not possible or it might confirm that the current bearer will result in a slower data transfer rate. The type of message will depend on the preferences set by the user. Further preferences might be set which require the device to check whether a suitable bearer is currently available. If so, the engine will instruct the device to confirm whether any suitable bearers are available at 250. Again, depending on the preferences set by the user, the engine may instruct the device to switch to the suitable bearer and transfer the data at 260. This may be handled automatically, based on predefined user preferences or indicated to the user for confirmation by presenting a message and requesting confirmatory input before download.

EXAMPLE 4

In further embodiments, the mobile device is configured to automatically backup its data, according to this example, before proceeding a backup client engine associated with the device evaluates the network environment. For example, the backup client is configured to interpret the mobile broadband connectivity of the user and either handle the beginning of backups automatically (i.e. the speed can change based on how much data is already downloaded) or make informed judgements and recommendations to the user.

More specifically, the profile for backing up data may require the engine to only back up when the network coverage is good (i.e. a signal strength of at least 70%), but that this may be overridden if a backup has not occurred for 24 hours. In this situation, the engine may be configured to use the system parameters available to make an informed judgement to perform the back up. Alternatively, the engine may send a message to the user, such as "System backup overdue, but system conditions not ideal. Perform backup anyway?"

In this way, this embodiment of the invention can make the user aware of the current below-standard system requirements, and prevent a poor user experience due to the potentially lengthy upload time required.

Alternatively, the profile for backing up data may require the engine to only back up when the network coverage is good, and the device is in its home network. Once again, however the profile may define that this may be overridden if a backup has not occurred for 24 hours and/or if any additional cost is likely to be less than a predetermined amount. In this situation, the engine may determine that the device is locate outside its home network, and that a backup has not occurred for 24 hours. It may also determine that only 1 Mb of data needs to be backed up, and the expected cost for uploading this data. If this cost is less the predetermined amount, the engine may make an informed judgement to perform the backup.

Alternatively, the engine may send a message to the user, such as "System backup overdue, but additional cost of approximately EX required. Proceed with backup?"

In this way, this embodiment of the invention can make the user aware of any potential additional costs, and prevent "bill shock" in relation to any unexpected additional charges.

Figure 4:
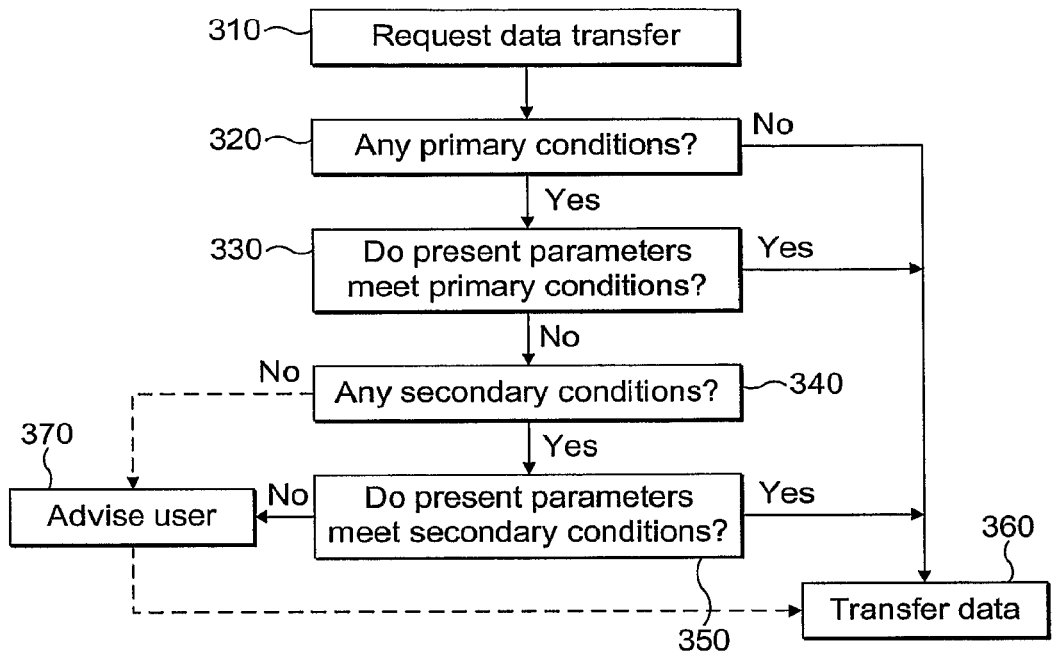
FIG. 4 is a flow diagram of an embodiment of the invention including secondary conditions for data transfer.

FIG. 4 covers an embodiment in which predefined secondary conditions may be set which allow the data transfer to be authorised in secondary, sub optimal conditions, if certain requirements are met. For example, if the primary conditions are not satisfied by the current operating parameters but no data transfer has been made for 24 hours then the engine may allow data transfer to take place in sub-optimal, secondary, conditions.

At 310 the engine receives a request for data transfer. The engine checks whether any primary conditions for data transfer exist at 320. If not, the engine instructs data transfer. If conditions do exist the engine confirms whether the current parameters meet those parameters defined in the primary conditions, for example, as discussed above, whether the bearer is acceptable, whether the device is roaming, whether the network coverage is sufficient, etc. If the current parameters meet the primary conditions at 330 then the engine instructs data transfer. If not, then the engine checks whether any secondary conditions exist at 340. Such secondary conditions are typically only relevant if certain requirements are met. Requirements may be based on time, for example time since last data transfer, based on number of refused data transfers, for example after 10 failed attempts then secondary conditions should be allowed, or based on some other requirement.

If secondary conditions do exist and the current situation meets the requirements, the engine compares the current parameters with those identified in the secondary conditions. Typically, the primary conditions will be more restrictive than the secondary conditions for a given parameter. For example the secondary conditions may specify that if backup has not occurred for 24 hours, then data transfer is allowed if the signal strength is above 40% (compared with an initial condition of 70%), or if a primary condition is that data transfer should only take place when camped on a 3G network, if the requirement is met then the secondary condition may allow data transfer to take place when caped on a 3G or 2G network.

So, if at 340 secondary conditions exist and the current situation meets the requirements then at 350 the engine determines whether the current parameters meet the secondary conditions. If yes, data is transferred at 360. If not, the user may be advised at 370. Alternatively, the device may automatically refuse to transfer the data.

EXAMPLE 5

A further embodiment of the invention relates to mobile devices which support a native onboard document store capability for documents are not touched over a predetermined period of time. In this further embodiment, rather than storing those documents in the onboard memory, the engine is configured to perform an automatic back up over the Internet. Advantageously this embodiment of the invention enables the document to be removed from the onboard memory, there by not storing any unnecessary documents in the valuable device memory, and serving to ensure that the device's storage space is utilised efficiently.

The engine may utilise parameter requirements in the predefined profile to make informed judgements and recommendations to the user. For example, the profile may define that engine is required to maintain a certain amount of onboard memory space at all times. In this situation, once the space threshold is exceeded, the engine could scan the memory for one or more documents of a suitable size to be removed, which have not been utilised for at least a predetermined period of time, or which were read the longest time ago. The documents could be automatically backed up or a recommendation put to the user, such as "Memory space below required level. Back up document A to remote server?"

A further advantageous feature that may be utilised in relation to this embodiment of the invention relates to when a user requires data from the remote server to be downloaded to the mobile device, such as to "restore" data lost due to a catastrophic device failure. In the interests of data security, the remote server needs to validate the identity of the user before providing the requested "restore" data. To date this has been achieved using a two factor authentication, such as a "username" and "password" approach. According to this further advantageous feature, the remote server additionally requires verification of the mobile device's SIM ID before releasing the requested data. In this way the physical presence of the SIM is tied to "something I have" verification (e.g. password) in order to enhance the data security. The data, of course, is also preferably transmitted across the network in encrypted form.

Figure 5:
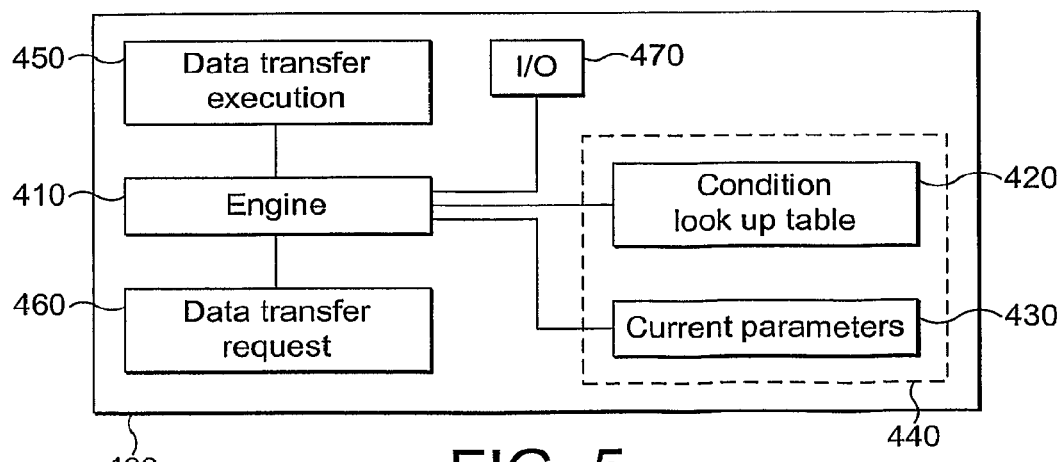
FIG. 5 is a block diagram showing elements of embodiments of the invention.

FIG. 5 is a block diagram showing the relevant components within a mobile device 400 for implementing embodiments of the present invention. The engine 410 is responsible for deciding whether to proceed with a request for transfer of data after receiving a request from the data transfer request means 460. The engine is linked to a look up table 420 which stores any conditions associated with data transfer and the current parameters associated with the mobile device 430. These data are stored in the memory 440. The engine is also connected to an input/output block 470. This enables the engine to request and receive input from the user and to update the user with the data transfer situation. Typically the output means is a video display unit or audio speaker. Finally, the engine is connected to the data transfer execution means 450 which will execute the data transfer.

All these embodiments of the invention utilise an awareness of the system environment in order to provide the user with an enhanced service and device usability.

All the embodiments are applicable to the upload/download of data, including streamed data and also data of a fixed size. Where the size of the fixed data can be determined/predicted, the engine can implement further criteria in deciding the suitability of the download/upload based on the existing network conditions and/or user requirements.

In this regard, a further feature that may be utilised independently, or in conjunction with any or all of these embodiments of the invention, is in relation to battery life of the mobile device. That is, where the size of the data download/upload is known as well as the channel speed available, the engine can be configured to obtain a time-based estimation of the battery life, and compare this with a time estimation for the data download/upload event. Where the battery life is not sufficient for the download/upload, the download/upload event can be postponed or otherwise not proceeded with. In this regard, the user may be warned that due to the battery life of the device the download/upload is unlikely to be completed.

The engine can be implemented in relation to the mobile device in any suitable manner. For instance, it may be implemented in hardware and/or software on the device itself. Alternatively it may be implemented on a separate device able to be connected to the mobile device, such as on a connectivity card, a memory card and/or a SIM. In a still further alternative, the engine may be implemented remotely from the mobile device, such as in an element of the communications network, or on a remote server, in communicable relation to the mobile device.

The term "data" as used throughout this specification is to be interpreted broadly and is considered to encompass information in any form, particularly any representation suitable for transmission across a mobile communications network, and most particularly digital data. The content of the data is also to be interpreted broadly and is considered to encompass, web pages, user information, network information, text, pictures and sounds.

The examples that have been described are to be taken as illustrative of the invention and not limiting. For example, any suitable system, device or user parameter that is variable may be used in controlling the allowability of a data transfer in a mobile network, particularly in regards to timing. It will be clear to those skilled in the art that embodiments of the invention can be used for all sorts of applications involving data transfer in both download direction, for example when a system searches for software updates at periodic intervals, for example antivirus software, as well as uplink direction, for example when a device looks to backup its files across a network.

The invention claimed is:

1. A method of controlling data transfer between a mobile device and a mobile telecommunications network, comprising:
   receiving a service request requiring a data transfer between the mobile device and the mobile telecommunications network;
   determining at least one parameter requirement relating to the service request from a predefined parameter profile, the at least one parameter requirement including a network/bearer type requirement relating to one or more network/bearer types suitable for the service request;
   determining one or more available network/bearer types currently available to the mobile terminal;
   comparing the one or more available network/bearer types with the network bearer type requirement; and
   using the comparison to control a timing of the data transfer, such that the data transfer is performed when at least one of the one or more available network/bearer types meets the network/bearer type requirement.

2. The method of claim 1, further comprising:
   determining a secondary requirement and at least one second relevant parameter requirement and, when the available network/bearer types do not meet the network/bearer type requirement, the method further comprising:
   determining whether the secondary requirement is met; and
   in dependence on the secondary requirement being met, comparing a current parameter state with the second relevant parameter requirement, wherein the timing of the data transfer is controlled in dependence on the result of the comparison.

3. The method of claim 2, wherein the at least one second relevant parameter requirement includes predefined acceptable parameters or acceptable parameter ranges.

4. The method of claim 2, wherein the network/bearer type requirement is more restrictive than the at least one second relevant parameter requirement.

5. The method of claim 1, wherein the one or more network bearer types is chosen from a plurality of possible network bearer types that includes at least a 2G network/bearer and a 3G network/bearer.

6. The method of claim 1, wherein the at least one parameter requirement determined for the service request includes a requirement relating to one or more of the following:
   a roaming status of the mobile device;
   signal strength measurement relating to the mobile device's serving base station;
   an indication of a data volume to be downloaded/uploaded;
   indication of a time and/or date when the requested service is to be allowed or disallowed;
   type of data back up to be performed;
   a minimum remaining capacity of a battery of the mobile device; and
   details of a tariff scheme relating to a user of the mobile device, including any inclusive download/upload data volume.

7. The method of claim 1, wherein the at least one parameter requirement determined includes one or more of the following:
   indication of whether the requested service is allowable, to be disallowed or allowable with limitations during roaming;
   indication of roaming limitations that apply to the requested service, such as download/upload maximum data volume;
   a minimum signal strength required for the requested service;
   indication of a time period and/or date when the requested service is to be allowed or disallowed; and
   indication of a maximum data download/upload volume for a given period of time.

8. The method of claim 1, wherein the step of controlling the timing of the data transfer further includes providing a user of the device with information regarding the comparison to make a decision whether to proceed with, defer or cancel the data transfer.

9. The method of claim 1, wherein the step of controlling the timing of the data transfer further includes:
   deferring the data transfer;
   monitoring at least one parameter state; and
   when the at least one parameter state fulfils at least one parameter requirement, allowing the service request to proceed.

10. The method of claim 1, wherein the service request is at least one of the following:
    a request to download data to the mobile terminal;
    a request to upload data from the mobile terminal;
    a request to back up data on the mobile terminal to a remote server; or
    a request to restore data to the mobile terminal from a remote server.

11. The method of claim 6, wherein the request is a data restore request, and the method further comprises:
    using a SIM identification to authenticate the user of the mobile terminal before allowing the data restore request.

12. The method of claim 1, wherein the at least one parameter requirement for the service request includes a minimum required signal strength, and the method further including determining a signal strength measurement relating to the mobile device's serving base station, and allowing the data transfer to proceed when the minimum signal strength measurement is equal to or greater than a given level.

13. A data transfer control engine for use in relation to a mobile device, the mobile device configured to communicate in a mobile telecommunications network, wherein the engine controls data transfer between the mobile device and a mobile telecommunications network, the engine comprising:

an input configured to receive a service request in relation to the mobile device; and a determination engine configured to:

determine at least one parameter requirement relating to the service request from a predefined parameter profile, the at least one parameter requirement including a network/bearer type requirement relating to one or more network/bearer types suitable for the service request;

determine one or more available network/bearer types currently available to the mobile terminal;

compare the one or more available network bearer/types with the network/bearer type requirement; and use the comparison to control a timing of the data transfer, such that the data transfer is performed when at least one of the one or more available network/bearer types meets the network/bearer type requirement.

14. The data transfer control engine of claim 13, further comprising:

a secondary requirement and at least one second relevant parameter requirement and, when the available network/bearer types do not meet the network/bearer type requirement, the determination engine being configured to:

determine whether the secondary requirement is met; and in dependence on the secondary requirement being met, compare a current parameter state with the second relevant parameter requirement, wherein the timing of the data transfer is controlled in dependence on the result of the comparison.

15. The data transfer control engine of claim 14, wherein the at least one second relevant parameter requirement includes predefined acceptable parameters or acceptable parameter ranges.

16. The data transfer control engine of claim 14, wherein the available network/bearer type requirement is more restrictive than the secondary relevant parameter requirement.

17. The data transfer control engine of claim 13, wherein the one or more network bearer types is chosen from a plurality of possible network/bearer types that includes at least a 2G network/bearer and a 3G network/bearer.

18. The data transfer control engine of claim 13, wherein the at least one parameter requirement for the service request includes a minimum required signal strength, and the determination engine being further configured to:

determine a signal strength measurement relating to the mobile device's serving base station, and allow the data transfer to proceed when the minimum signal strength measurement is equal to or greater than a given level.

19. A mobile device, comprising:

a data transfer control engine for use in relation to the mobile device, the mobile device configured to communicate in a mobile telecommunications network, the engine including:

an input configured to receive a service request in relation to the mobile device, in which the service request requires a data transfer between the mobile device and the mobile telecommunications network; and a determination engine configured to:

determine at least one parameter requirement relating to the service request from a predefined parameter profile, the at least one parameter requirement including a network/bearer type requirement relating to one or more network/bearer types suitable for the service request;

determine one or more available network/bearer types currently available to the mobile terminal;

compare the one or more available network/bearer types with the network bearer type requirement; and use the comparison to control a timing of the data transfer, such that the data transfer is performed when at least one of the one or more available network/bearer types meets the network/bearer type requirement.

20. The mobile device of claim 19, wherein the device is at least one of the following:

a) a mobile telephone;

b) a Personal Digital Assistant (PDA); and c) a portable computer with a mobile enabled network connectivity.

21. The mobile device of claim 19, wherein the one or more suitable network bearer types is chosen from a plurality of possible network/bearer types that includes at least a 2G network/bearer and a 3G network/bearer.

22. The mobile device of claim 19, wherein the at least one parameter requirement for the service request includes a minimum required signal strength, and the determination engine being further configured to:

determine a signal strength measurement relating to the mobile device's serving base station, and allow the data transfer to proceed when the minimum signal strength measurement is equal to or greater than a given level.

\* \* \* \* \*